United States Patent [19]

Almond et al.

[11] Patent Number: 4,487,867

[45] Date of Patent: Dec. 11, 1984

[54] WATER SOLUBLE ANIONIC POLYMER COMPOSITION AND METHOD FOR STIMULATING A SUBTERRANEAN FORMATION

[75] Inventors: Stephen W. Almond; Edith Scott, both of Duncan, Okla.

[73] Assignee: Halliburton Company, Duncan, Okla.

[21] Appl. No.: 506,759

[22] Filed: Jun. 22, 1983

[51] Int. Cl.³ .................... E21B 43/25; E21B 43/27; C08L 1/26; C08L 1/28

[52] U.S. Cl. .................................. 524/42; 524/43; 524/45; 524/55; 524/501; 523/130; 523/131; 252/8.55

[58] Field of Search .............. 524/42, 43, 45, 55, 524/501; 523/130, 131; 252/8.55; 175/65

[56] References Cited

U.S. PATENT DOCUMENTS

| | | | |
|---|---|---|---|
| 2,351,258 | 6/1944 | Freeman et al. | 524/42 |
| 2,768,143 | 10/1956 | Henry | 524/55 |
| 2,883,298 | 4/1959 | Meadows | 524/45 |
| 3,379,721 | 4/1968 | Reid | 524/45 |
| 3,455,714 | 7/1969 | Bishop et al. | 524/42 |
| 3,625,889 | 8/1969 | Branscum | 252/8.5 A |
| 3,804,174 | 4/1974 | Chatterji et al. | 106/93 |
| 3,898,165 | 8/1975 | Ely et al. | 106/203 |
| 3,959,003 | 5/1976 | Ostroot et al. | 106/93 |
| 4,040,967 | 8/1977 | Nimerick et al. | 166/308 |
| 4,042,529 | 8/1977 | Nimerick et al. | 166/283 |
| 4,097,667 | 6/1978 | Holst et al. | 536/87 |
| 4,144,179 | 3/1979 | Chatterji | 252/8.55 R |
| 4,225,445 | 9/1980 | Dixon | 523/130 |
| 4,265,673 | 5/1981 | Pace et al. | 106/177 |
| 4,309,535 | 1/1982 | Majewicz | 536/85 |

*Primary Examiner*—John Kight
*Assistant Examiner*—Nathan M. Nutter
*Attorney, Agent, or Firm*—Thomas R. Weaver; Edward F. Sherer

[57] ABSTRACT

A composition and method for stimulating a subterranean formation. The composition contains an anionic polymer which is readily dispersible in water, having a molecular weight sufficient to thicken water, and a cationic or amphoteric polymer or mixtures thereof.

18 Claims, No Drawings

//  4,487,867

WATER SOLUBLE ANIONIC POLYMER COMPOSITION AND METHOD FOR STIMULATING A SUBTERRANEAN FORMATION

FIELD OF THE INVENTION

This invention relates to a method of improving the dispersibility of water soluble anionic polymers which are particularly useful in stimulating a subterranean formation.

BACKGROUND OF THE INVENTION

Oil and gas accumulations usually occur in porous and permeable underground rock formations. In order to produce the oil and gas contained in a formation, a well is drilled into the formation. The oil and gas, in many instances, are contained in the pore spaces of the formation, and are hydraulically connected by means of permeability or interconnecting channels between the pore spaces. After the well is drilled into the formation, oil and gas are displaced into the well bore by means of fluid expansion, natural and artificial fluid displacement, gravity drainage, etc. These various processes may work together or independently to drive the hydrocarbons into the well bore through existing flow channels. If production of the well is impaired by insufficient channels leading into the well bore, the formation, in many instances, is treated to increase the ability of the formation rock to conduct fluid into the well bore.

Acidizing of a subterranean formation penetrated by a well bore has been widely employed for increasing the production of fluids, e.g. crude oil, natural gas, etc., from the formation. The usual technique of acidizing a subterranean formation comprises introducing a nonoxidizing acid into the well under sufficient pressure to force the acid into the formation where it reacts with acid soluble components of the formation. The technique is not limited to formations of high acid solubility such as limestone, dolomite, etc. The technique is also applicable to other types of formations such as sandstone containing streaks or striations of acid soluble components such as ferrous carbonates.

During the acid treating operation, passageways for fluid flow are created in the formation or existing passageways therein are enlarged, thus stimulating the production of fluids from the formation. Acidizing operations wherein the acid is injected into the formation at a pressure or rate insufficient to create cracks or fractures in the formation is usually referred to as matrix acidizing.

Hydraulic fracturing is also widely used for stimulating petroleum producing subterranean formations and comprises the injection of a suitable fracturing fluid down a well bore penetrating a formation and into the formation under sufficient pressure to overcome the pressure exerted by the overburden. This results in creating a crack or fracture in the formation to provide a passageway which facilitates the fluid of fluids through the formation and into the well. When the pressure of the fracturing fluid is reduced, a propping agent which is many times present in the fracturing fluid, prevents the complete closure of the fracture. Combination fracture-acidizing processes are well known in the art.

Increasing the viscosity of the fluid used in acidizing or fracturing of the formation has several benefits. In acidizing and/or fracture acidizing of subterranean formations, gelled fluids are useful in preventing the acid from becoming prematurely spent and inactive. In addition, gelling of the acid solutions enables the development of wider fractures so that the live acid can be forced further into the formation from the well bore. Furthermore, increasing the viscosities of the fluids permits better fluid loss control.

Water soluble polymers have been used in the past to increase the viscosity of fluids used in acidizing and fracturing processes.

Many water soluble polymers, however, exhibit one common problem which can be a difficulty to the user when it is desired to use the polymers in an aqueous solution. They are poorly dispersible in the water and thus require long periods of time to disperse in water as the individual particles tend to agglomerate when the polymer is mixed with water. Because rapid hydration takes place over the surface of the agglomerated aggregates to form gel-coated lumps and the interiors remain substantially dry, these lumps are then extremely difficult to disperse. This effect is aggravated by the fact that some polymers have a tendency to float on the surface of the water allowing partially dissolved particles to agglomerate into large lumps or masses. In order to break up the lumps or masses and facilitate rapid dispersion and solution of the polymers, it is necessary that the polymers be subjected to very strenuous agitation for relatively long periods of time.

One technique which has been proposed previously to prevent the agglomeration of water soluble polymers has been to treat the polymers with crosslinking agents, especially by crosslinking them with glyoxal. The crosslinking renders the polymers temporarily or partially insoluble to water. This method, however, has not been particularly effective on polymers which contain carboxyl groups and ionically charged polymers.

The present invention provides a method of treating water soluble anionic polymers which overcomes or at least mitigates the above-mentioned problems.

SUMMARY OF THE INVENTION

The present invention provides a method of rendering various water soluble anionic polymers readily dispersible in water. The method is carried out by mixing in a polar liquid the water soluble anionic polymers with a cationic or amphoteric polymer to form a mixture. In instances where the cationic or amphoteric polymer is added to the anionic polymer in an amount of from about 25 to about 75 percent by weight of the anionic polymer, it is necessary to add a salt to the mixture to hydrate the water soluble anionic polymers. The mixture can also be dried or concentrated, such as by filtration, and thereafter the concentrated mixture or dry material and salt is added to an aqueous liquid. The water soluble anionic polymers and the cationic or amphoteric polymers can also be blended dry prior to their addition to the polar liquid.

The polymers can be utilized in aqueous fluids which are used in fracturing fluids, acidizing fluids, and other similar utilities wherein thickened or viscous aqueous solutions are desired.

DESCRIPTION OF THE PREFERRED EMBODIMENTS

In accordance with the invention there is provided a method of rendering water soluble anionic polymers more dispersible in water. Examples of anionic polymers that can be used to carry out the invention include gum karaya, gum tragacanth, gum ghatti, gum acacia, psyllium, carrageenin, carboxyalkyl guar, wherein said alkyl group has from about 1 to about 3 carbon atoms, carboxyalkyl hydroxyalkyl guar wherein said alkyl groups have from about 1 to about 3 carbon atoms, carboxyalkyl cellulose wherein said alkyl group has from about 1 to about 3 carbon atoms, carboxyalkyl hydroxyalkyl cellulose wherein said alkyl groups have from about 1 to about 3 carbon atoms, polyacrylamide, polyacrylate, acrylate-acrylamide copolymers, xanthan gum, and mixtures thereof.

Examples of carboxyalkyl guars that can be used in carrying out the method of the invention include carboxymethyl guar and carboxyethyl guar. Suitable carboxyalkyl hydroxyalkyl guars include carboxymethyl hydroxyethyl guar, carboxyethyl hydroxyethyl guar, carboxymethyl hydroxypropyl guar, and carboxyethyl hydroxypropyl guar. Examples of carboxyalkyl cellulose are carboxymethyl cellulose and carboxyethyl cellulose. Examples of carboxyalkyl hydroxyalkyl cellulose are carboxymethyl hydroxypropyl cellulose, carboxymethyl hydroxyethyl cellulose, carboxyethyl hydroxypropyl cellulose, and carboxyethyl hydroxyethyl cellulose. The preferred anionic polymer in carrying out the invention is carboxymethyl hydroxyethyl cellulose.

The anionic polymers used in the invention must have a molecular weight sufficient to increase the viscosity of an aqueous liquid when they are added to the liquid.

To the anionic polymer is added a cationic or amphoteric polymer. The cationic or amphoteric polymer is added to the anionic polymer in an amount from about 1.0 to about 75 percent by weight of the anionic polymer. By amphoteric, it is meant that the polymer has a cationic character when the pH of the polymer is below the $pK_a$ value of the polymer. Generally, a pH of about 8 to about 10 is sufficient to produce the cationic character of the amphoteric polymer. The cationic or amphoteric polymer causes the anionic polymer to become more readily dispersible in an aqueous liquid. Examples of cationic or amphoteric polymers that are suitable in carrying out the method of the invention are cationic or amphoteric polymers having a molecular weight of at least 1,000 and selected from the group consisting of an amphoteric polymer having a pH below the $pK_a$ value of the polymer and having repeating units of the general formula:

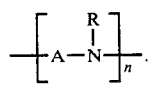  I wherein R is selected from the group consisting of hydrogen and an alkyl having from about 1 to 3 carbon atoms;
A is selected from the group consisting of an alkylene having 2 to 4 carbon atoms, a hydroxyalkylene having 2 to 4 carbon atoms, an aliphatic which with the N atom forms a heterocyclic group containing 5 to 6 atoms in the ring of which 4 to 5 are carbon;
n is an integer equal to the number of monomer units of said polymer required to give the polymer a molecular weight of at least 1,000;
a polymer having repeating units of the general formula:

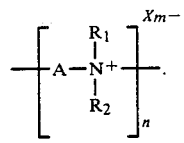  II wherein $R_1$ and $R_2$ are independently selected from the group consisting of hydrogen and an alkyl having from about 1 to 3 carbon atoms
A is selected from the group consisting of an alkylene having 2 to 4 carbon atoms, a hydroxyalkylene having 2 to 4 carbon atoms, an aliphatic which with the N atom forms a heterocyclic group containing 5 to 6 atoms in the ring of which 4 to 5 are carbon and
X is a halogen, sulfate, hydroxyl, methyl sulfate, and mixtures thereof;
m is an integer equal to the number of anions required to maintain electronic neutrality; and,
n is an integer equal to the number of monomer units of said polymer required to give the polymer a molecular weight of at least 1,000; and
a polymer having repeating units of the general formula:

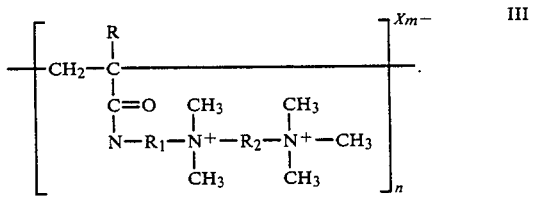  III wherein R is hydrogen or methyl;
$R_1$ is an alkylene group having from about 2 to about 5 carbon atoms and preferably propyl;
$R_2$ is an unsubstituted alkylene group having from about 2 to about 6 carbon atoms or a substituted alkylene having from about 2 to about 6 carbon atoms and containing a hydroxyl group or from about 1 to about 3 ether groups and preferably 2-hydroxypropyl;
X is an anion selected from the group consisting of chlorine, bromine, iodine, sulfate, hydroxyl, methyl sulfate and mixtures thereof;
m is an integer equal to the number of anions required to maintain electronic neutrality; and
N is an integer equal to the number of monomer units of said polymer required to give the polymer a molecular weight of at least 1,000.

After the anionic and cationic or amphoteric polymers have been added to the polar liquid to form a mixture, the mixture containing the polymers can be dried, concentrated such as by filtration to form a damp solid, or kept in the mixture.

Optionally, the anionic polymers and the cationic or amphoteric polymer may be blended together in a dry state and subsequently added to the polar liquid.

In instances where the cationic or amphoteric polymer is added to the anionic polymer in an amount of from about 1 to about 25 percent by weight of anionic polymer, it is not necessary to add the salt to hydrate the anionic polymer although the salt can be used for faster hydration of the anionic polymer.

When the cationic or amphoteric polymer is added to the anionic polymer in amounts greater than 25 percent by weight of the anionic polymer, it is necessary to add a salt to the anionic and cationic or amphoteric polymers. Since the salt causes the polymers to hydrate, it is preferred that the salt be added to the dried material rather than to the polymers in a damp solid or slurry. Adding the salt to the polymers in a damp solid or slurry can cause the polymer to set up or harden and make use of the polymers difficult.

Polymers of the above general formula I and II and methods of their preparation are well known in the art. Examples of these polymers include poly(ethyleneamine), poly(propyleneamine), poly(ethyl-1-N-methylamine), the quaternized salts of these polymers, poly(ethyl-1,1-N-methylammonium chloride), poly(2-hydroxypropyl-1,1-N-dimethylammonium chloride), and poly(diallyldimethylammonium chloride).

One method of preparing poly(methacrylamido-4,4,8,8-tetra-methyl-4,8-diaza-6-hydroxypropyltrimethylammonium chloride), a polymer of general formula III, comprises preparing the monomer by reacting 3-chloro-2-hydroxypropyltrimethylammonium chloride with N',N'-dimethyl-amino-N-propylmethacrylamide. When this reaction is carried out, poly(methacrylamido-4,4,8,8-tetramethyl-4,8-diaza-6-hydroxynonamethylene dichloride) (PMTDHD) is produced.

PMTDHD is readily polymerizable. Any known polymerization initiator of the free radical type may be used. Examples of suitable polymerization initiators include L-butyl hydroperoxide, ammonium persulfate, and alkali metal persulfates. The monomers may be polymerized in either a water solution or an emulsion (water-in-oil) process.

The preferred cationic or amphoteric polymer for carrying out the invention is poly-2-hydroxypropyl-1,1-N-dimethylammonium chloride.

Furthermore, crosslinked polymers of general formula I, II, and III can be used in the practice of the invention. In general, the crosslinked polymers can be prepared by adding a crosslinking agent to the polymer. Examples of suitable crosslinking agents include divinylbenzene, divinylether, and the like. The crosslinking agents can be used in small amounts, e.g. up to one percent by weight of the polymer.

The polymer that is being made more dispersible in water, namely the anionic polymer, generally must be of such molecular weight that the polymer increases the viscosity of an aqueous liquid when incorporated into the aqueous liquid. To this polymer, is added a dispersing polymer, namely the cationic or amphoteric polymer. The cationic or amphoteric polymer must have a molecular weight of at least 1,000. When the method is carried out, an anionic polymer, which is very dispersible in an aqueous liquid, is achieved. The anionic polymer is particularly useful in stimulating a subterranean formation.

One method of preparing the dispersible anionic polymers is carried out by adding the anionic polymer and the cationic or amphoteric polymer to a polar liquid which should be present in an amount to allow sufficient mixing of the polymers. Generally, any polar liquid can be used for this purpose. Examples of suitable polar liquids include water, methanol, ethanol, propanol, isopropanol, and mixtures thereof. Preferably, methanol or isopropanol is utilized as lesser amounts of the cationic or amphoteric polymer are required when using either of these liquids. After the polymers are added to the polar liquid, the polymers are mixed to form a mixture. At this point, the mixture containing the polymers can be dried, concentrated such as by filtration to form a damp solid or kept in the mixture.

In those instances where the cationic or amphoteric polymer is added to the anionic polymer in an amount from about greater than 25 percent by weight of the anionic polymer to about 75 percent by weight of the anionic polymer, it is necessary to add the salt to hydrate the anionic polymer.

In those instances where a salt is utilized in the method of the invention, the salt utilized is selected from the group consisting of alkali metal halogens, alkali earth metal halogens, zinc halogens, ammonium halogens and mixtures thereof. Examples of suitable salts include sodium chloride, potassium chloride, sodium fluoride, sodium bromide, calcium chloride, barium chloride, lithium chloride, and ammonium chloride. The preferred salt is potassium chloride. Since the salt causes the polymers to hydrate, it is preferred that the salt be added to the dried material rather than to the polymers in a damp solid or mixture. Adding the salt to the polymers in a damp solid or mixture can cause the polymer to set up or harden and make the use of the polymer difficult. Therefore when the damp solid or mixture is utilized, it is preferred that the damp solid or mixture be added to the aqueous liquid prior to the addition of the salt to the damp solid or mixture. Optionally, the salt can be first added to the aqueous liquid followed by the addition of the damp solid or mixture containing the polymers.

When salts are utilized to carry out the method of the invention, the amount of the salts used will vary over a wide range depending, for example, on the anionic or cationic or amphoteric polymers utilized and the concentration of the anionic and cationic or amphoteric polymers. As a general rule however, the amount of salt used in hydrating the anionic polymer will be in the range of from about 0.25 percent to about 50.0 percent, preferably 0.5 percent to about 10 percent by weight of the anionic polymer and cationic or amphoteric polymer.

The amount of the anionic and cationic or amphoteric polymers that are utilized to carry out the invention will vary over a great range. Generally, however, the amount of the cationic or amphoteric polymer utilized will be about 1.0 to about 75.0 weight percent of the anionic polymer and more preferably from 2.0 to about 50.0 weight percent of the anionic polymer. The amounts of cationic and anionic polymers most effective with any particular system can be easily ascertained by conducting simple preliminary trials.

When the cationic or amphoteric polymer is added to the anionic polymer in an amount of from about 1 to about 25 percent by weight of the anionic polymer, and no salt is utilized, the resulting water dispersible anionic polymer will hydrate slower than if salt were utilized. In those instances where rapid hydration is preferred, a salt can be added to the mixture containing the anionic polymer and the cationic or amphoteric polymer. When the cationic or amphoteric polymer is utilized in an amount greater than 25 percent by weight of the anionic polymer, the salt is required for proper hydration of the anionic polymer.

The anionic polymers of the invention can be utilized in either fracturing or acidizing of a subterranean formation. In this application, the anionic polymer which is rendered more dispersible in water is prepaed by adding the anionic and cationic or amphoteric polymers to a polar liquid to form a mixture. The mixture then can be concentrated, dried, or kept as a mixture. If the mixture is dried, the salt, if utilized, can be incorporated into the dry material. Since the salt causes the polymer to hydrate, it is preferred that when the mixture or damp solid is utilized, that the mixture or damp solid can be added to the aqueous liquid prior to the addition of the salt. Optionally, the salt can be first added to the aqueous liquid followed by the addition of the damp solid or mixture containing the polymers. If the aqueous liquid is in an acidizing operation, the acid is preferably added at this stage to the aqueous liquid containing the polymers. Any conventional mixing apparatus can be employed for this purpose. The amount of anionic and cationic or amphoteric polymers used in the aqueous fluid used for stimulating the subterranean formation will vary widely depending upon the properties desired in the composition which is used to stimulate the subterranean formation. In general, the amount of polymers used will vary but will generally be in the range of from about 0.1 to about 1 percent by weight of aqueous fluid. There is, however, really no limit on the amount of polymer which can be used as long as the aqueous treating fluid can be pumped in accordance for the methods of the invention.

When the polymers are to be utilized in acidizing a subterranean formation, any acid which is compatible with the polymers and is effective in increasing the flow of hydrocarbons through the formation and into the well included with the polymers. Thus, under proper conditions examples of such acids include inorganic acids, such as hydrochloric acid, hydrofluoric acid, phosphoric acid, nitric acid, and sulfuric acid; organic acids having 1 to 4 carbon atoms such as formic acid, acetic acid, propionic acid, butyl acid, and mixtures thereof and combinations of organic and inorganic acids. Nonoxidizing acids are preferred and hydrochloric acid is the most preferred acid. The concentration and strength of the acid will depend upon the type of acid, the type of formation being treated, the results desired, and the particular treating operation. Generally speaking, the concentration of the acid will vary over a wide range and will usually be from about 0.4 to about 60 weight percent depending on the type of acid with concentrations within the range of 10 to 50 weight percent usually preferred based upon the total weight of the acidic composition. When an inorganic acid such as hydrochloric acid is utilized, the amount of hydrochloric acid will usually fall within the range of from about 0.4 to about 35, more preferably at least about 10 weight percent based on the total weight of the gelled acidic composition. Amounts within the range of from about 10 to about 30 weight percent will frequently be practical amounts to use.

The acid composition used to stimulate the subterranean formation may also contain other ingredients such as corrosion inhibitors, emulsifying agents, sequestering agents, friction reducers, propping agents, and other ingredients well known in the art.

The acidizing and/or fracturing operations are utilized by any suitable method and these methods are well known in the art. For instance, when the treated polymer is utilized in the acidizing fluid, the fluid is introduced into the formation containing the calcerous deposits via an injection into the well using any convenient method as understood in the acidizing art. After the injection of the fluid into the deposits, the fluid attacks the deposits, with such usually being completed within three to four hours of the injection, and thereafter the spent fluid may be withdrawn by pumping, swabbing, or allowing the well to flow back. Additionally, when the well is a disposal or injection well, the acidizing fluid can be introduced into the well in any convenient manner as understood in this art with the acid contacting the structures or strata to be treated and thereafter the spent fluid is dispersed into the structures or strata by a displacing fluid, usually water.

When the polymers are utilized in fracturing of the formation, the fluid containing the polymer is injected into the formation at such pressure that the formation is fractured. Thereafter, with increased permeability of the formation, the well is prepared for return of operation and then allowed to produce hydrocarbons. Furthermore, acidizing can be combined with the fracturing operation. The use of the polymer in the above stated manner has been found to be very effective in treating subterranean formations.

The following examples will serve to more comprehensively illustrate certain specific embodiments of the invention, but are not intended to be construed so as to be restrictive of the spirit and scope thereof.

EXAMPLE I

The polymers of the present invention were tested by adding an aliquot of a cationic polymer selected from Table I, and 0.5 g of an anionic polymer selected from Table II to 10 ml. of methanol to form a mixture. The mixture was added to 90 ml. of deionized water. The hydration rate was monitored at 1 minute, 2 minutes, 3 minutes, 4 minutes, 5 minutes, and 30 minutes after the addition of the salt with a Fann Model 35 viscometer at 300 rpm. and 76° F. The viscometer was equipped with a No. 1 spring and fitted with a standard bob and sleeve. The results of these tests are shown in Table III.

TABLE I

Code for Anionic Polymers Used in the Examples

| Chemical Code | Polymer | Common Name | Manufacturer |
|---|---|---|---|
| A1 | Carboxymethyl guar$^a$ | CMG | — |
| A2 | Carboxymethylhydroxypropyl guar$^b$ | CMHPG | — |
| A3 | Carboxymethylcellulose$^c$ | CMC 9H4 | Hercules, Inc. |
| A4 | Carboxymethylhydroxyethylcellulose$^d$ | CMHEC 420H | Hercules, Inc. |
| A5 | Carboxyethylhydroxyethylcellulose$^e$ | CEHEC | — |
| A6 | Polyacrylamide (35% hydrolyzed) | ALLOMER 120 | Allied Colloids |

TABLE I-continued
Code for Anionic Polymers Used in the Examples

| Chemical Code | Polymer | Common Name | Manufacturer |
|---|---|---|---|
| A7 | Xanthan gum | XANCO FRAC | Kelco Company |

[a] The carboxymethyl guar had a carboxymethyl degree of substitution (D.S.) of 0.6.
[b] The carboxymethylhydroxypropyl guar had a carboxymethyl degree of substitution (D.S.) of 0.3 and a hydroxypropyl molar substitution (M.S.) of 0.6.
[c] The carboxymethylcellulose had a carboxymethyl degree of substitution (D.S.) of 0.9.
[d] The carboxymethylhydroxyethylcellulose had a carboxymethyl degree of substitution (D.S.) of 0.4 and a hydroxyethyl molar substitution (M.S.) of 2.0.
[e] The carboxymethylhydroxyethylcellulose had a carboxymethyl degree of substitution (D.S.) of 0.5 and a hydroxyethyl molar substitution (M.S.) of 2.0.

TABLE II
Code for Amphoteric or Cationic Polymers Used in the Examples

| Chemical Code | Polymer | Common Name | Manufacturer |
|---|---|---|---|
| C1 | Polyethyleneamine resin | P-600 | Cordova Chemical Co. |
| C2 | Poly(2-hydroxypropyl-1,1-N—dimethyl-ammonium chloride) | Nalw 108 | Nalco Chemical Co. |
| C3 | Poly(diallyldimethylammonium chloride) | MERQUAT ® 100 | Calgon Corp. |
| C4 | Poly(methacrylamido-4,4,8,8-tetramethyl-4,8-diaza-6,hydroxymonomethylene dichloride) | — | Celanese Corp. |

TABLE III

| Test No. | Polymer Dispersed (Anionic) Code | Conc. (PPM) | Dispersing Polymer (Cationic) Code | Conc. (PPM) | Salt Type | Conc. (PPM) | 1 min | 2 min | 3 min | 4 min | 5 min | 30 min |
|---|---|---|---|---|---|---|---|---|---|---|---|---|
| 1 | A1 | 5000 | — | — | — | — | 37 | 37 | 37 | 38 | 38 | 38 |
| 2 | A1 | 5000 | — | — | KCl | 20000 | 22 | 27 | 29 | 30 | 31 | 33 |
| 3 | A1 | 5000 | C1 | 500 | — | — | 29 | 32 | 33 | 33 | 34 | 35 |
| 4 | A1 | 5000 | C1 | 1500 | — | — | — | 4 | 6.5 | 8 | 10 | 13 |
| 5 | A1 | 5000 | C1 | 1500 | KCl | 20000 | 19 | 22 | 23 | 24 | 24 | 26 |
| 6 | A1 | 5000 | C2 | 200 | — | — | 4 | 7 | 13 | 19 | 23 | 39 |
| 7 | A1 | 5000 | C2 | 800 | — | — | 4 | 6 | 6 | 7 | 7 | 9 |
| 8 | A1 | 5000 | C2 | 800 | KCl | 20000 | 21 | 25 | 26 | 27 | 27 | 29 |
| 9 | A1 | 5000 | C3 | 300 | — | — | 20 | 24 | 26 | 27 | 27 | 27 |
| 10 | A1 | 5000 | C3 | 300 | KCl | 20000 | 12 | 19 | 23 | 26 | 28 | 33 |
| 11 | A1 | 5000 | C4 | 250 | — | — | 28 | 30 | 31 | 31 | 31 | 34 |
| 12 | A1 | 5000 | C4 | 750 | — | — | 17 | 22 | 22 | 23 | 23 | 22 |
| 13 | A1 | 5000 | C4 | 750 | KCl | 20000 | 22 | 31 | 32 | 32 | 32 | 32 |
| 14 | A1 | 5000 | C4 | 1250 | — | — | 6 | 14 | 15 | 16 | 16 | 18 |
| 15 | A1 | 5000 | C4 | 1250 | KCl | 2000 | 18 | 31 | 33 | 33 | 33 | 33 |
| 16 | A2 | 5000 | — | — | — | — | 27 | 29 | 30 | 30 | 31 | 32 |
| 17 | A2 | 5000 | — | — | KCl | 20000 | 22 | 27 | 29 | 30 | 31 | 33 |
| 18 | A2 | 5000 | C1 | 2500 | — | — | 4 | 5 | 5 | 6 | 6 | 6 |
| 19 | A2 | 5000 | C1 | 2500 | KCl | 20000 | 6 | 24 | 28 | 31 | 33 | 34 |
| 20 | A2 | 5000 | C2 | 200 | — | — | 11 | 18 | 22 | 25 | 27 | 42 |
| 21 | A2 | 5000 | C2 | 400 | — | — | 3.5 | 4 | 4 | 4 | 5 | 7 |
| 22 | A2 | 5000 | C2 | 400 | KCl | 20000 | 6.5 | 20 | 27 | 30 | — | — |
| 23 | A2 | 5000 | C3 | 300 | — | — | 17 | 23 | 25 | 27 | 31 | 38 |
| 24 | A2 | 5000 | C3 | 600 | — | — | 4 | 6 | 6 | 6 | 6 | 7 |
| 25 | A2 | 5000 | C3 | 600 | KCl | 20000 | 7 | 26 | 32 | 32 | 33 | 33 |
| 26 | A2 | 5000 | C4 | 750 | — | — | — | 6 | 13 | 15 | 16 | 18 |
| 27 | A2 | 5000 | C4 | 750 | KCl | 20000 | 18 | 25 | 30 | 32 | 32 | 33 |
| 28 | A3 | 5000 | — | — | — | — | 21 | 25 | 27 | 28 | 30 | 31 |
| 29 | A3 | 5000 | — | — | KCl | 20000 | 8 | 10 | 11 | 12 | 13 | 17 |
| 30 | A3 | 5000 | C1 | 1500 | — | — | 5 | 5 | 5 | 5 | 5 | 8 |
| 31 | A3 | 5000 | C1 | 1500 | KCl | 20000 | 8 | 17 | 17 | 17 | 17 | 17 |
| 32 | A3 | 5000 | C2 | 1200 | — | — | 6 | 6 | 6 | 6 | 6 | 4 |
| 33 | A3 | 5000 | C2 | 1200 | KCl | 20000 | 4 | 10 | 13 | 14 | 15 | 15 |
| 34 | A3 | 5000 | C3 | 1500 | — | — | 6 | 8 | 11 | 14 | 16 | 17 |
| 35 | A3 | 5000 | C3 | 1500 | KCl | 20000 | 17 | 17 | 17 | 17 | 17 | 17 |
| 36 | A3 | 5000 | C4 | 1250 | — | — | 5 | 5 | 5 | 5 | 5 | 7 |
| 37 | A3 | 5000 | C4 | 1250 | KCl | 20000 | 7 | 18 | 21 | 24 | 24 | 24 |
| 38 | A4 | 5000 | — | — | — | — | 29 | 31 | 31 | 32 | 32 | 32 |
| 39 | A4 | 5000 | — | — | KCl | 20000 | 20 | 26 | 29 | 31 | 32 | 36 |
| 40 | A4 | 5000 | C1 | 1500 | — | — | 17 | 23 | 24 | 23 | 23 | 24 |
| 41 | A4 | 5000 | C1 | 1500 | KCl | 20000 | 24 | 31 | 32 | 32 | 33 | 33 |
| 42 | A4 | 5000 | C1 | 2500 | — | — | 8 | 9 | 9 | 10 | 10 | 12 |
| 43 | A4 | 5000 | C1 | 2500 | KCl | 20000 | 12 | 36 | 37 | 38 | 38 | 38 |
| 44 | A4 | 5000 | C2 | 200 | — | — | 3 | 3 | 4 | 4 | 4 | 7 |
| 45 | A4 | 5000 | C2 | 200 | KCl | 20000 | 20 | 27 | 29 | — | — | 33 |
| 46 | A4 | 5000 | C3 | 600 | — | — | 10 | 12 | 12 | 12 | 12 | 8 |

Solution Apparent Viscosity (Centipoise @ 511 sec$^{-1}$)

TABLE III-continued

| Test No. | Polymer Dispersed (Anionic) Code | Conc. (PPM) | Dispersing Polymer (Cationic) Code | Conc. (PPM) | Salt Type | Conc. (PPM) | SOLUTION APPARENT VISCOSITY (Centipoise @ 511 sec$^{-1}$) 1 min | 2 min | 3 min | 4 min | 5 min | 30 min |
|---|---|---|---|---|---|---|---|---|---|---|---|---|
| 47 | A4 | 5000 | C3 | 600 | KCl | 20000 | 8 | 35 | 35 | 35 | 35 | 35 |
| 48 | A4 | 5000 | C4 | 750 | — | — | 12 | 17 | 18 | 19 | 19 | 21 |
| 49 | A4 | 5000 | C4 | 750 | KCl | 20000 | 21 | 32 | 34 | 34 | 34 | 34 |
| 50 | A5 | 5000 | — | — | — | — | 22 | 27 | 27 | 28 | 28 | 32 |
| 51 | A5 | 5000 | — | — | KCl | 20000 | 14 | 17 | 19 | 21 | 21 | 22 |
| 52 | A5 | 5000 | C1 | 2500 | — | — | 8 | 9 | 9 | 9 | 10 | 12 |
| 53 | A5 | 5000 | C1 | 2500 | KCl | 20000 | 12 | 34 | 35 | 35 | 35 | 34 |
| 54 | A5 | 5000 | C2 | 800 | — | — | 4 | 4 | 4 | 4 | 4 | 4 |
| 55 | A5 | 5000 | C2 | 800 | KCl | 20000 | 4 | 25 | 29 | 31 | 31 | 32 |
| 56 | A5 | 5000 | C3 | 900 | — | — | 5 | 5 | 5 | 4 | 4 | 4 |
| 57 | A5 | 5000 | C3 | 900 | KCl | 20000 | 4 | 30 | 31 | 32 | 32 | 31 |
| 58 | A5 | 5000 | C4 | 1250 | — | — | 7 | 9 | 10 | 10 | 10 | 11 |
| 59 | A5 | 5000 | C4 | 1250 | KCl | 20000 | 11 | 25 | 25 | 25 | 25 | 25 |
| 60 | A6 | 5000 | — | — | — | — | 23 | 28 | 28 | 35 | 38 | 43 |
| 61 | A6 | 5000 | — | — | KCl | 20000 | 9 | 11 | 13 | 16 | 18 | 23 |
| 62 | A6 | 5000 | C1 | 250 | — | — | 11 | 21 | 31 | 40 | 43 | 42 |
| 63 | A6 | 5000 | C1 | 500 | — | — | 6 | 6 | 8 | 10 | 10 | 16 |
| 64 | A6 | 5000 | C1 | 500 | KCl | 20000 | 16 | 17 | 17 | 18 | 18 | 18 |
| 65 | A6 | 5000 | C2 | 200 | KCl | 20000 | 5 | 8 | 10 | 12 | 13 | 25 |
| 66 | A6 | 5000 | C3 | 600 | — | — | 6 | 8 | 9 | 9 | 8 | 8 |
| 67 | A6 | 5000 | C3 | 600 | KCl | 20000 | 8 | 15 | 16 | 17 | 17 | 19 |
| 68 | A6 | 5000 | C4 | 250 | — | — | 8 | 10 | 16 | 17 | 18 | 30 |
| 69 | A6 | 5000 | C4 | 250 | KCl | 20000 | 21 | 23 | 23 | 23 | 23 | 23 |
| 70 | A7 | 5000 | — | — | — | — | 34 | 41 | 42 | 45 | 51 | 52 |
| 71 | A7 | 5000 | — | — | KCl | 20000 | 9 | 10 | 10 | 11 | 12 | 14 |
| 72 | A7 | 5000 | C1 | 250 | — | — | 10 | 21 | 31 | 40 | 43 | 42 |
| 73 | A7 | 5000 | C1 | 250 | KCl | 20000 | 25 | 26 | 21 | 21 | 21 | 21 |
| 74 | A7 | 5000 | C1 | 500 | — | — | 6 | 8 | 8 | 8 | 8 | 8 |
| 75 | A7 | 5000 | C1 | 500 | KCl | 20000 | 8 | 18 | 19 | 19 | 18 | 19 |
| 76 | A7 | 5000 | C2 | 300 | — | — | 13 | 7 | 8 | 8 | 10 | 11 |
| 77 | A7 | 5000 | C2 | 300 | KCl | 20000 | 10 | 11 | 10 | 10 | 10 | 10 |
| 78 | A7 | 5000 | C3 | 300 | — | — | 6 | 7 | 7 | 7 | 7 | 6 |
| 79 | A7 | 5000 | C3 | 300 | KCl | 20000 | 15 | 15 | 16 | 16 | 16 | 16 |
| 80 | A7 | 5000 | C4 | 125 | — | — | 5 | 5 | 7 | 7 | 6 | 7 |
| 81 | A7 | 5000 | C4 | 125 | KCl | 20000 | 7 | 16 | 16 | 17 | 17 | 18 |

EXAMPLE II

The polymers of the present invention were tested by initially hydrating the anionic polymer in deionized water. An aliquot of cationic polymer was added to the hydrated anionic polymer, and the anionic polymer was precipitated from solution. The viscosity of the solution was measured with a Fann Model 35 Viscometer at 300 rpm. and 76° F. The viscometer was equipped with a No. 1 spring and fitted with a standard bob and sleeve.

Salt was added to the solution allowing the anionic polymer to rehydrate and a viscosity was taken 30 minutes after salt addition. The results of these tests are shown in Table IV.

TABLE IV

| Test No. | Anionic Polymer Type | PPM | Cationic Polymer Type | PPM | Salt Type | PPM | Solution Apparent Viscosity (Centipoise @ 511 sec$^{-1}$) Before Salt | After Salt |
|---|---|---|---|---|---|---|---|---|
| 1 | A4 | 4800 | C3 | 1600 | KCl | 4800 | 1.0 | 1.0 |
| 2 | A4 | 4800 | C3 | 1600 | KCl | 10800 | 1.0 | 39.5 |
| 3 | A4 | 4800 | C3 | 1600 | NaCl | 3600 | 1.0 | 1.0 |
| 4 | A4 | 4800 | C3 | 1600 | NaCl | 9600 | 1.0 | 37.0 |
| 5 | A4 | 4800 | C3 | 1600 | CaCl$_2$ | 2400 | 1.0 | 1.0 |
| 6 | A4 | 4800 | C3 | 1600 | CaCl$_2$ | 7200 | 1.0 | 36.0 |
| 7 | A4 | 4800 | C2 | 1600 | KCl | 10800 | 1.0 | 39.0 |
| 8 | A4 | 10800 | C2 | 1600 | KCl | 10800 | 7.0 | 125.0 |

Although certain preferred embodiments of the invention have been herein described for illustrative purposes, it will be appreciated that various modifications of the procedures and compositions recited may be effected without departure from the basic principles which underlie the invention. Changes of this type are therefore deemed to lie within the spirit and scope of the invention except as may be necessarily limited by the amended claims and reasonable equivalents thereof.

What is claimed is:

1. A water soluble anionic polymer composition comprising:

(a) an anionic polymer having a molecular weight sufficient to thicken water and selected from the group consisting of gum karaya, gum tragacanth, gum ghatti, gum acacia, psyllium, carrageenin, carboxyalkyl guar, wherein said alkyl group has from 1 to about 3 carbon atoms, carboxyalkyl hydroxylalkyl guar wherein said alkyl groups have from 1 to about 3 carbon atoms, carboxyalkyl cellulose wherein said alkyl group has from 1 to about 3 carbon atoms, carboxyalkyl hydroxyalkyl cellulose wherein said alkyl groups have from 1 to about 3 carbon atoms, polyacrylamide, polyacrylate, acrylamide-acrylate copolymers, xanthan gum, and mixtures thereof; and, (b) a cationic or amphoteric polymer selected from the group consisting of poly(diallyldinoethylammonium chloride), repeating monomer units of the formulae:

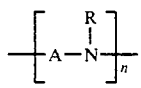

wherein

R is selected from the group consisting of hydrogen and an alkyl having from 1 to about 3 carbon atoms;

A is selected from the group consisting of an alkylene having 2 to 4 carbon atoms and a hydroxyalkylene having 2 to 4 carbon atoms;

n is an integer equal to the number of monomer units of said polymer required to give the polymer a molecular weight of at least 1,000;

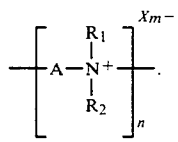

wherein $R_1$ and $R_2$ are independently selected from the group consisting of hydrogen and an alkyl having from 1 to about 3 carbon atoms A is selected from the group consisting of an alkylene having 2 to 4 carbon atoms and a hydroxyalkylene having 2 to 4 carbon atoms;

X is selected from the group consisting of a halogen, sulfate, hydroxyl, and methyl sulfate;

m is an integer equal to the number of anions required to maintain electronic neutrality; and, n is an integer equal to the number of monomer units of said polymer required to give the polymer a molecular weight of at least 1,000;

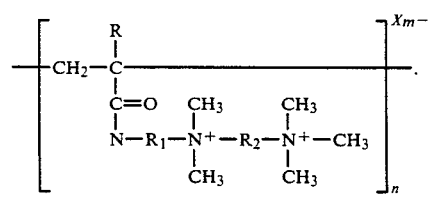

wherein

R is hydrogen or methyl;

$R_1$ is an alkylene group having from about 2 to about 5 carbon atoms;

$R_2$ is an unsubstituted alkylene group having from about 2 to about 6 carbon atoms or a substituted alkylene having from about 2 to about 6 carbon atoms and containing a hydroxyl group or from 1 to about 3 ether groups;

X is an anion selected from the group consisting of chlorine, bromine, iodine, sulfate, hydroxyl, and methyl sulfate;

m is an integer equal to the number of anions required to maintain electronic neutrality; and, n is an integer equal to the number of monomer units of said polymer required to give the polymer a molecular weight of at least 1,000; and mixtures thereof, said cationic or amphoteric polymer being present in the range of from about 1 to about 25 percent by weight of said anionic polymer.

2. The composition recited in claim 1 wherein said anionic polymer is selected from the group consisting of carboxyalkyl guar, carboxyalkyl hydroxyalkyl guar, carboxyalkyl cellulose, carboxyalkyl hydroxyalkyl cellulose and mixtures thereof wherein said alkyl groups have from 1 to about 3 carbon atoms.

3. The composition recited in claim 1 wherein said cationic or amphoteric polymer is selected from the group consisting of poly(ethyleneamine), poly(propyleneamine), poly(ethyl-1-N-methylamine), poly(ethyl-1,1-N-methylammonium chloride), poly(2-hydroxypropyl-1,1-N-dimethylammonium chloride), poly-(diallyldimethylammonium chloride), poly(methacrylamido-4,4,8,8-tetramethyl-4,8-diaza-6-hydroxynonamethylene chloride), and mixtures thereof.

4. A water soluble anionic polymer composition comprising:

(a) an anionic polymer having a molecular weight sufficient to thicken water and selected from the group consisting of gum karaya, gum tragacanth, gum ghatti, gum acacia, psyllium, carrageenin, carboxyalkyl guar, wherein said alkyl group has from 1 to about 3 carbon atoms, carboxyalkyl hydroxyalkyl guar wherein said alkyl groups have from 1 to about 3 carbon atoms, carboxyalkyl cellulose wherein said alkyl group has from 1 to about 3 carbon atoms, carboxyalkyl hydroxyalkyl cellulose wherein said alkyl groups have from 1 to about 3 carbon atoms, polyacrylamide, polyacrylate, acrylamide-acrylate copolymers, xanthan gum, and mixtures thereof;

(b) a cationic or amphoteric polymer present in the range of from about 1 to about 75 percent by weight of said anionic polymer and selected from the group consisting of poly(diallyldimethylammonium chloride), repeating monomer units of the formulae:

wherein

R is selected from the group consisting of hydrogen and an alkyl having from 1 to about 3 carbon atoms;

A is selected from the group consisting of an alkylene having 2 to 4 carbon atoms and a hydroxyalkylene having 2 to 4 carbon atoms;

n is an integer equal to the number of monomer units of said polymer required to give the polymer a molecular weight of at least 1,000;

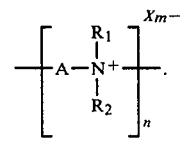

wherein $R_1$ and $R_2$ are independently selected from the group consisting of hydrogen and an alkyl having from 1 to about 3 carbon atoms A is selected from the group consisting of an alkylene having 2 to 4 carbon atoms and a hydroxyalkylene having 2 to 4 carbon atoms;

X is selected from the group consisting of a halogen, sulfate, hydroxyl, and methyl sulfate;

m is an integer equal to the number of anions required to maintain electronic neutrality; and, n is an integer equal to the number of monomer units of said polymer required to give the polymer a molecular weight of at least 1,000;

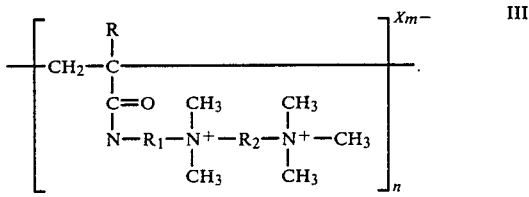

wherein

R is hydrogen or methyl;

$R_1$ is an alkylene group having from about 2 to about 5 carbon atoms;

$R_2$ is an unsubstituted alkylene group having from about 2 to about 6 carbon atoms or a substituted alkylene having from about 2 to about 6 carbon atoms and containing a hydroxyl group or from about 1 to about 3 ether groups;

X is an anion selected from the group consisting of chlorine, bromine, iodine, sulfate, hydroxyl, and methyl sulfate;

m is an integer equal to the number of anions required to maintain electronic neutrality; and n is an integer equal to the number of monomer units of said polymer required to give the polymer a molecular weight of at least 1,000; and mixtures thereof; and, (c) a salt selected from the group consisting of alkali metal halogens, alkali earth metal halogens, zinc halogens, ammonium halogens, and mixtures thereof.

5. The composition recited in claim 4 wherein said anionic polymer is selected from the group consisting of carboxyalkyl guar, carboxyalkyl hydroxyalkyl guar, carboxyalkyl cellulose, carboxyalkyl hydroxyalkyl cellulose and mixtures thereof wherein said alkyl groups have from 1 to about 3 carbon atoms.

6. The composition recited in claim 4 wherein said cationic or amphoteric polymer is selected from the group consisting of poly(ethyleneamine), poly(propyleneamine), poly(ethyl-1-N-methylamine), poly(ethyl-1,1-N-methylammonium chloride), poly(2-hydroxypropyl-1,1-N-dimethylammonium chloride), poly-(diallyldimethylammonium chloride), poly(methacrylamido-4,4,8,8-tetramethyl-4,8diaza-6-hydroxynonamethylene chloride), and mixtures thereof.

7. The composition recited in claim 4 wherein said salt is selected from the group consisting of sodium chloride, potassium chloride, sodium fluoride, sodium bromide, calcium chloride, barium chloride, lithium chloride, ammonium chloride and mixtures thereof.

8. A method of acidizing a subterranean formation comprising:

(a) contacting said formation with an acidic liquid, said acidic liquid comprising an acid, water, and the composition recited in claim 1, said composition being present in sufficient quantity to thicken said liquid.

9. A method of acidizing a subterranean formation comprising:

(a) contacting said formation with an acidic liquid, said acidic liquid comprising an acid, water, and the composition recited in claim 4, said composition being present in sufficient quantity to thicken said liquid.

10. A method of fracturing a subterranean formation comprising:

(a) contacting said formation with a sufficient pressure to fracture said formation with an aqueous liquid containing the composition recited in claim 1, said composition being present in sufficient quantity to thicken said liquid.

11. A method of fracturing a subterranean formation comprising:

(a) contacting said formation with a sufficient pressure to fracture said formation with an aqueous liquid containing the composition recited in claim 4, said composition being present in sufficient quantity to thicken said liquid.

12. The method recited in claim 9 wherein said anionic polymer is selected from the group consisting of carboxyalkyl guar, carboxyalkyl hydroxyalkyl guar, carboxyalkyl cellulose, carboxyalkyl hydroxyalkyl cellulose and mixtures thereof wherein said alkyl groups have from 1 to about 3 carbon atoms.

13. The method recited in claim 8 wherein said cation or amphoteric polymer is selected from the group consisting of poly(ethyleneamine), poly(propyleneamine), poly(ethyl-1-N-methylamine), poly(ethyl-1,1-N-methylammonium chloride), poly(2-hydroxypropyl-1,1-N-dimethylammonium chloride), poly(diallyldimethylammonium chloride), poly(methacrylamido-4,4,8,8-tetramethyl-4,8-diaza-6-hydroxynonamethylene chloride), and mixtures thereof.

14. The method recited in claim 8 wherein said anionic polymer is selected from the group consisting of carboxyalkyl guar wherein said alkyl group has from 1 to about 3 carbon atoms, carboxyalkyl hydroxyalkyl guar wherein said alkyl groups have from 1 to about 3 carbon atoms, carboxyalkyl cellulose wherein said alkyl group has from 1 to about 3 carbon atoms, carboxyalkyl hydroxyalkyl cellulose wherein said alkyl groups have from 1 to about 3 carbon atoms and mixtures thereof.

15. The method recited in claim 10 wherein said cationic or amphoteric polymer is selected from the group consisting of poly(ethyleneamine), poly(propyleneamine), poly(ethyl-1-N-methylamine), poly(ethyl-1,1-N-methylammonium chloride), poly(2-hydroxypropyl-1,1-N-dimethylammonium chloride), poly(diallyldimethylammonium chloride), poly(methacrylamido-4,4,8,8-tetramethyl-4,8-diaza-6-hydroxynonamethylene dichloride), and mixtures thereof.

16. The method recited in claim 10 wherein said salt is selected from the group consisting of sodium chloride, potassium chloride, sodium fluoride, sodium bromide, calcium chloride, barium chloride, lithium chloride, ammonium chloride and mixtures thereof.

17. The method recited in claim 10 wherein said cationic or amphoteric polymer is present in the range of from about 2.0 to 50.0 percent by weight of said anionic polymer.

18. The method recited in claim 10 wherein said salt is present in the range of from about 0.25 to about 50.0 percent by weight of the anionic polymer.

* * * * *

UNITED STATES PATENT AND TRADEMARK OFFICE
CERTIFICATE OF CORRECTION

PATENT NO. : 4,487,867

DATED : Dec. 11, 1984

INVENTOR(S) : Almond et al.

It is certified that error appears in the above-identified patent and that said Letters Patent is hereby corrected as shown below:

In column 4, lines 1-8, delete the following formula:

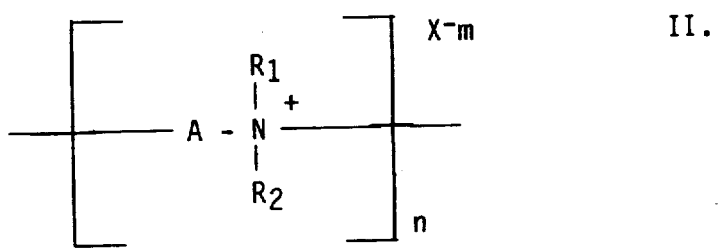

and insert therefor--

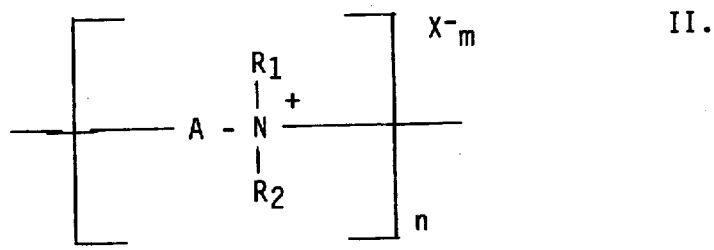

UNITED STATES PATENT AND TRADEMARK OFFICE
CERTIFICATE OF CORRECTION

PATENT NO. : 4,487,867
DATED : Dec. 11, 1984
INVENTOR(S) : Almond et al.

It is certified that error appears in the above-identified patent and that said Letters Patent is hereby corrected as shown below:

In column 4, lines 28-36, delete the following formula:

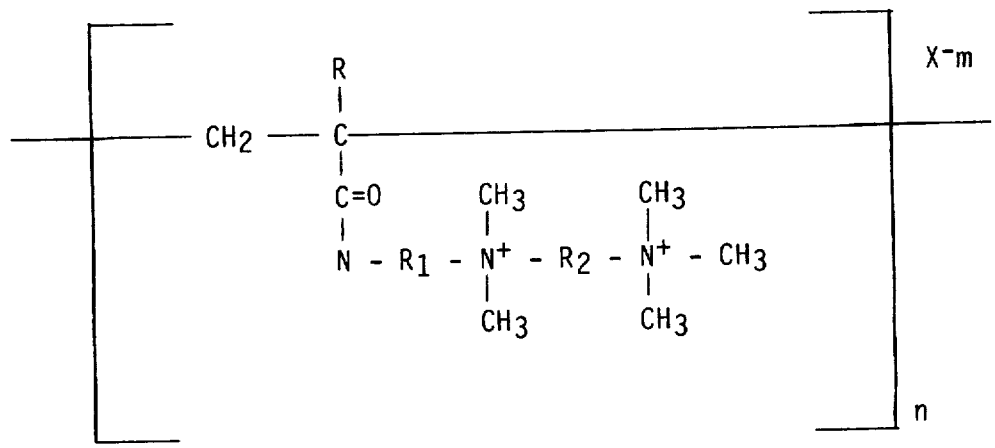

and insert therefor --

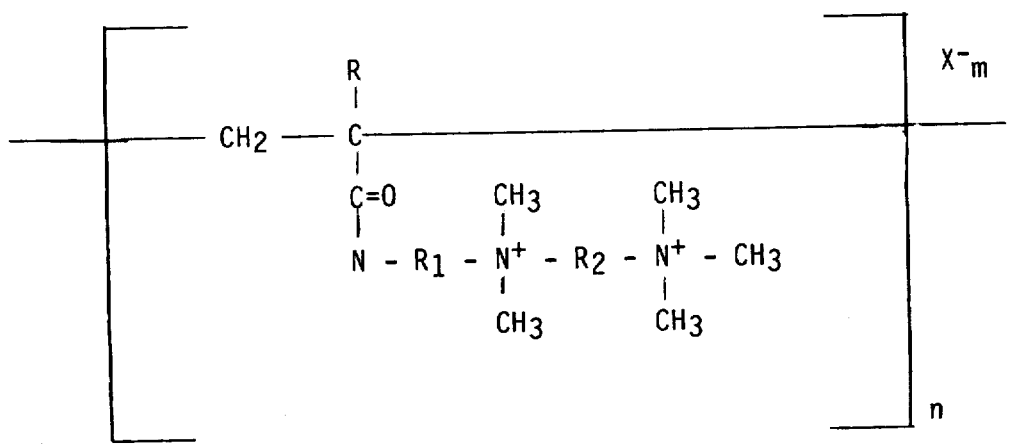

--.

UNITED STATES PATENT AND TRADEMARK OFFICE
CERTIFICATE OF CORRECTION

PATENT NO. : 4,487,867

DATED : Dec. 11, 1984

INVENTOR(S) : Almond et al.

It is certified that error appears in the above-identified patent and that said Letters Patent is hereby corrected as shown below:

In column 13, lines 20-25, delete the following formula:

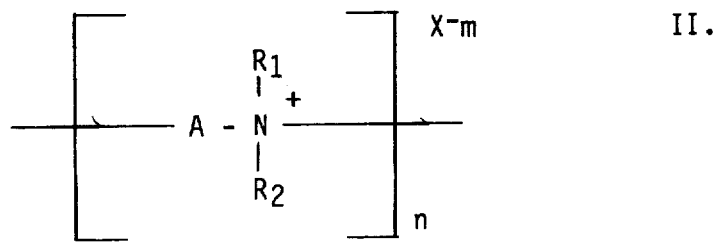

and insert therefor--

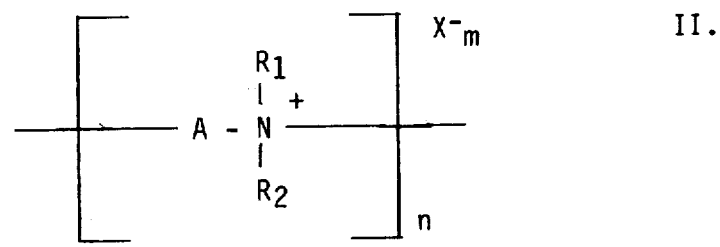

--.

UNITED STATES PATENT AND TRADEMARK OFFICE
CERTIFICATE OF CORRECTION

PATENT NO. : 4,487,867

DATED : Dec. 11, 1984

INVENTOR(S) : Almond et al.

It is certified that error appears in the above-identified patent and that said Letters Patent is hereby corrected as shown below:

In column 13, lines 42-49, delete the following formula:

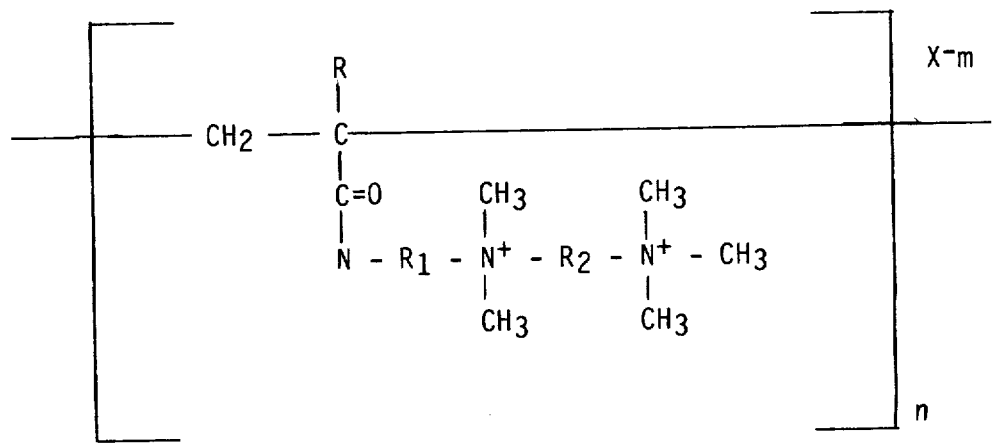

and insert therefor --

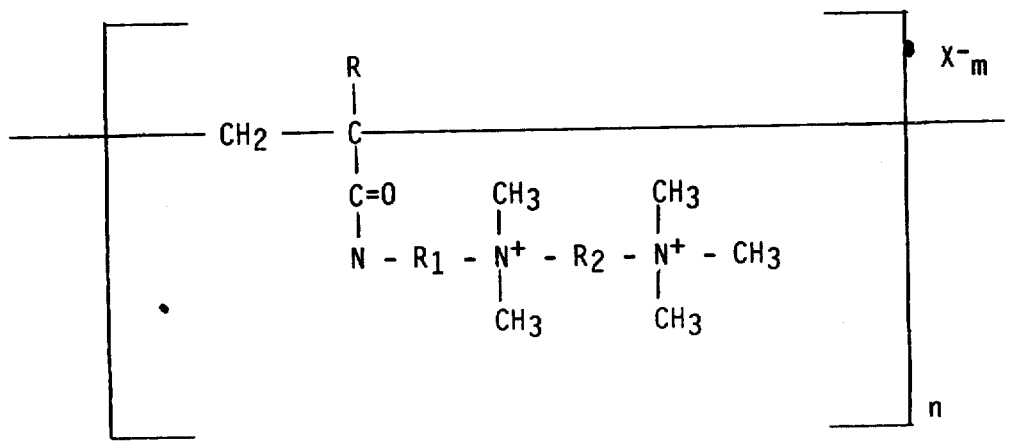

--.

UNITED STATES PATENT AND TRADEMARK OFFICE
CERTIFICATE OF CORRECTION

PATENT NO. : 4,487,867
DATED : Dec. 11, 1984
INVENTOR(S) : Almond et al.

It is certified that error appears in the above-identified patent and that said Letters Patent is hereby corrected as shown below:

In column 14, lines 58-63, delete the following formula:

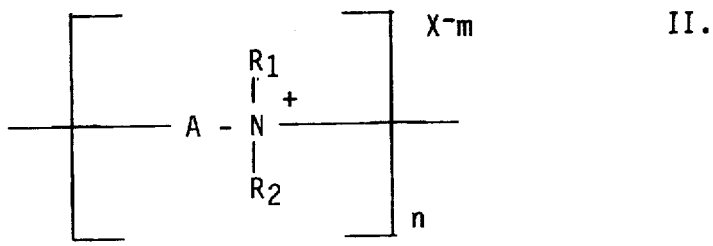

and insert therefor--

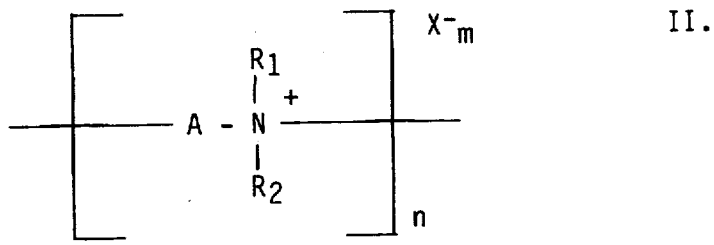

--.

UNITED STATES PATENT AND TRADEMARK OFFICE
CERTIFICATE OF CORRECTION

PATENT NO. : 4,487,867

DATED : Dec. 11, 1984

INVENTOR(S) : Almond et al.

It is certified that error appears in the above-identified patent and that said Letters Patent is hereby corrected as shown below:

In column 15, lines 13-19, delete the following formula:

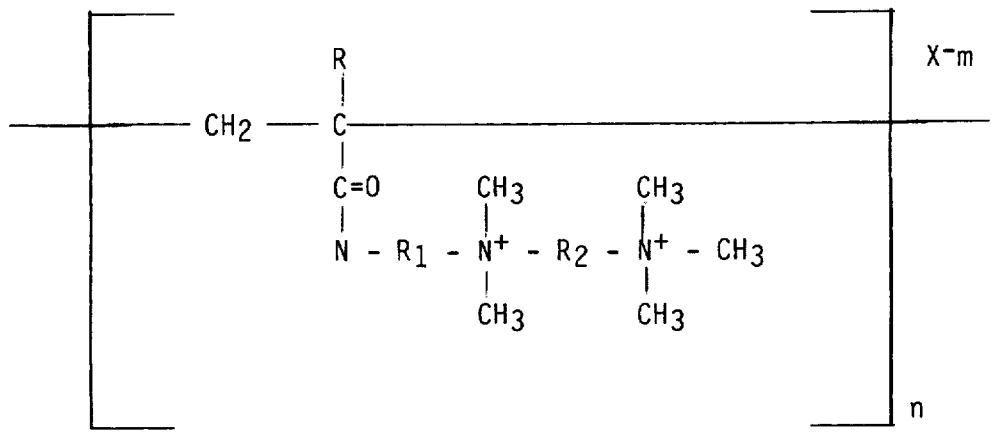

and insert therefor --

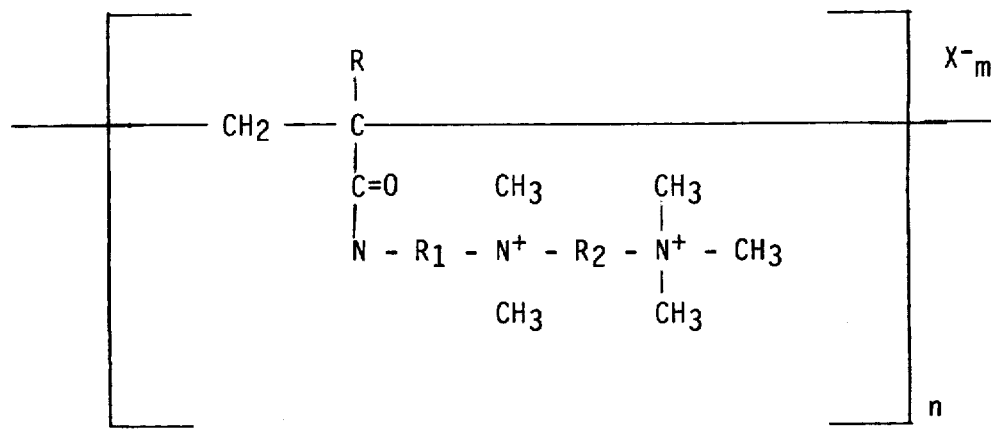

--.

UNITED STATES PATENT AND TRADEMARK OFFICE
CERTIFICATE OF CORRECTION

PATENT NO. : 4,487,867
DATED : Dec. 11, 1984
INVENTOR(S) : Almond et al.

It is certified that error appears in the above-identified patent and that said Letters Patent is hereby corrected as shown below:

In column 1 line 58, delete the word "fluid" and insert therefor --flow--.
In column 12, line 68, and continuing in column 13 line 1, delete "poly(diallyldinoethylammonium chloride)" and insert therefor --poly(diallyldimethylammonium chloride--.

In column 15, line 55 - 57, delete "poly(methacryl-amido-4,4,8,8-tetramethyl-4,8diaza-6-hydroxynonamethylene chloride)" and insert therefor --poly(methacrylamido-4,4,8,8-tetramethyl-4,8-diaza-6-hydroxynonamethylene chloride)--.
In column 16, line 29, delete the word "cation" and insert therefor --cationic--.

Signed and Sealed this

Sixteenth Day of July 1985

[SEAL]

Attest:

DONALD J. QUIGG

Attesting Officer  Acting Commissioner of Patents and Trademarks